United States Patent [19]

Matsuda et al.

[11] Patent Number: 5,668,353
[45] Date of Patent: Sep. 16, 1997

[54] INPUT PANEL AVOIDING INTERFERENCE PATTERN AND METHOD OF FORMING THE SAME

[75] Inventors: Genichi Matsuda; Toshiaki Tanaka, both of Kawasaki, Japan

[73] Assignee: Fujitsu Limited, Kawasaki, Japan

[21] Appl. No.: 406,323

[22] Filed: Mar. 17, 1995

[30] Foreign Application Priority Data

Mar. 18, 1994 [JP] Japan .................. 6-049500

[51] Int. Cl.$^6$ .................. G08C 21/00; G09G 3/02
[52] U.S. Cl. .................. 178/18; 178/19; 345/173; 345/174; 345/175
[58] Field of Search .................. 178/18, 19, 20; 345/156, 157, 166, 173, 174, 175, 176

[56] References Cited

U.S. PATENT DOCUMENTS

| | | | |
|---|---|---|---|
| 3,959,585 | 5/1976 | Mattes | 178/18 |
| 4,484,026 | 11/1984 | Thornburg | 178/20 |
| 4,529,959 | 7/1985 | Ito | 345/174 |
| 4,700,025 | 10/1987 | Hatayama | 200/5 |
| 4,818,827 | 4/1989 | Ipcinski | 178/18 |
| 5,010,213 | 4/1991 | Moriwaki | 178/18 |
| 5,172,101 | 12/1992 | Bates | 345/157 |
| 5,220,136 | 6/1993 | Kent | 178/18 |
| 5,262,778 | 11/1993 | Saunders | 178/18 |

FOREIGN PATENT DOCUMENTS

| | | |
|---|---|---|
| 1052353 | 2/1989 | Japan . |
| 6-28088 | 2/1994 | Japan . |
| 2180952 | 4/1987 | United Kingdom . |

*Primary Examiner*—Curtis Kuntz
*Assistant Examiner*—Vijay Shankar
*Attorney, Agent, or Firm*—Greer, Burns & Crain, Ltd.

[57] ABSTRACT

An input panel of a resistance layer type includes a first board having a first transparent conductive layer on its surface and a second board having a second transparent conductive layer on its surface. The first board and the second board are arranged such that the first transparent conductive layer faces the second transparent conductive layer. The input panel further includes first spacers arranged between the first board and the second board, the first spacers being non-conductive and having a height no greater than 14 μm, and second spacers arranged between the first board and the second board among the first spacers, the second spacers being non-conductive and having a height no smaller than 15 μm.

10 Claims, 7 Drawing Sheets

$\Delta = 2m \cdot \lambda/2$ (m: INTEGER) ······ BRIGHT
$\Delta = (2m+1)\lambda/2$ (m: INTEGER) ······ DARK

INPUT PANEL AVOIDING INTERFERENCE PATTERN AND METHOD OF FORMING THE SAME

BACKGROUND OF THE INVENTION

1. Field of the Invention

The present invention generally relates to input devices using an input pen, a touch panel, and the like used in personal computers, word processors, handy terminals, electronic notes, etc., and more particularly relates to an input device of a resistance layer type.

2. Description of the Prior Art

FIGS. 1A and 1B show an input panel of a resistance layer type of the prior art. As shown in FIGS. 1A and 1B, the input panel includes a lower board 1 and an upper board 2 which are provided on one surface thereof with transparent conductive layers 3 and 4, respectively. These two boards 1 and 2 are arranged such that the surfaces bearing the transparent conductive layers 3 and 4 face each other. Between the conductive layers 3 and 4, insulating spacers 5 are placed in a dot form or in a mesh form.

FIG. 2 shows a control circuit of the input panel of FIG. 1. As shown in FIG. 2, the upper conductive layer 4 is provided with X-coordinate electrodes 17 and 18, and the lower conductive layer 3 is provided with Y-coordinate electrodes 19 and 20. These electrodes are electrically connected as shown in FIG. 2.

When a pen and the like is pushed against the upper board 2 so as to establish an electrical contact between the upper conductive layer 4 and the lower conductive layer 3, X and Y coordinates of the contact location can be obtained. This panel can be provided on a display panel of a such device as a liquid crystal display (LCD) device, thus providing means for coordinate input.

In the input panel as described above, the two conductive layers 3 and 4 are arranged with a short gap therebetween held by the spacers 5, which gap is typically shorter than 14 μm. Thus, there is optical interference between the two conductive layers 3 and 4, so that interference patterns as shown in FIG. 3 appear on the display. Such interference patterns hinder visibility of the display shown on the panel.

Accordingly, there is a need in the field of input panels for an input panel which can avoid the optical interference without degrading an input sensitivity of the input panel.

SUMMARY OF THE INVENTION

Accordingly, it is a general object of the present invention to provide an input panel which can satisfy the need described above.

It is another and more specific object of the present invention to provide an input panel which can avoid optical interference without degrading an input sensitivity of the input panel.

In order to achieve the above objects, an input panel of a resistance layer type according to the present invention includes a first board having a first transparent conductive layer on one surface thereof, a second board having a second transparent conductive layer on one surface thereof, the first board and the second board being arranged such that the first transparent conductive layer faces the second transparent conductive layer, first spacers arranged between the first board and the second board, the first spacers being non-conductive and having a height no greater than 14 μm, and second spacers arranged between the first board and the second board among the first spacers, the second spacers being non-conductive and having a height no smaller than 15 μm.

In the input panel according to the present invention, the second spacers having a height no smaller than 15 μm are arranged in a mixture with the smaller first spacers, so that the gap between the conductive layers can be widened to prevent a generation of interference patterns. Also, the smaller first spacers can keep a desirable input characteristic in terms of the input sensitivity, which would be lost when using only the taller second spacers.

Other objects and further features of the present invention will be apparent from the following detailed description when read in conjunction with the accompanying drawings.

DESCRIPTION OF THE PREFERRED EMBODIMENTS

In the following, a principle and embodiments of the present invention will be described with reference to the accompanying drawings.

Figure 1:
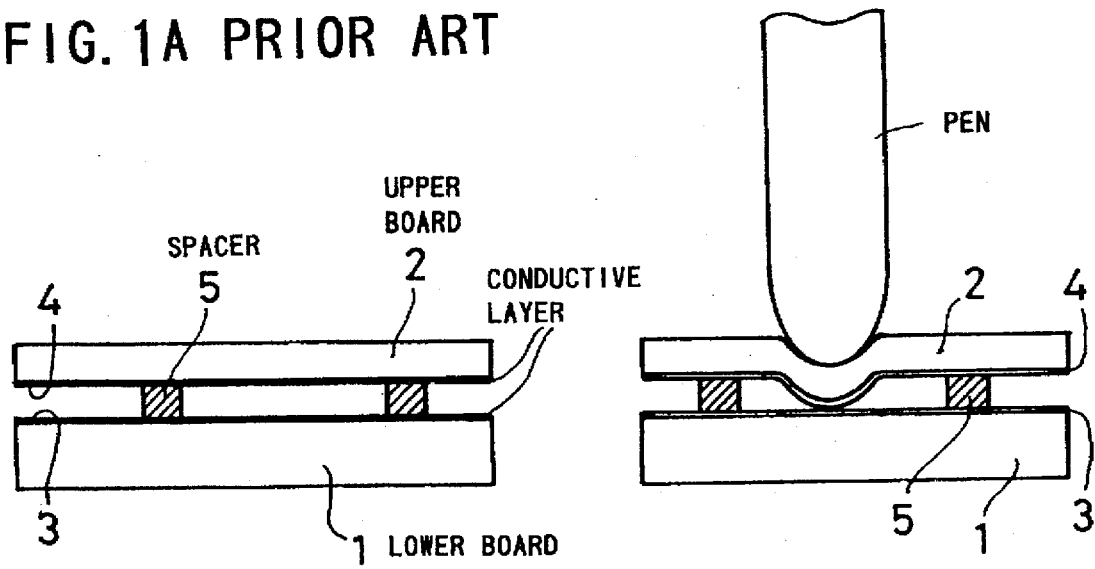
FIGS. 1A and 1B are cross-sectional views of an input panel of the prior art.
Figure 2:
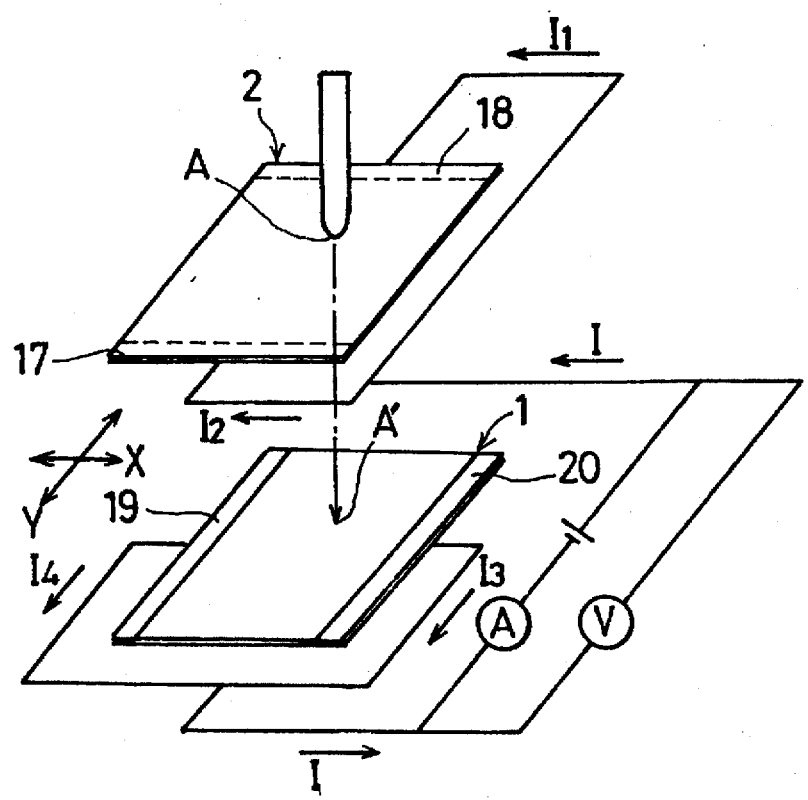
FIG. 2 is an expanded view of the input panel of FIG. 1 showing its control circuit.
Figure 3:
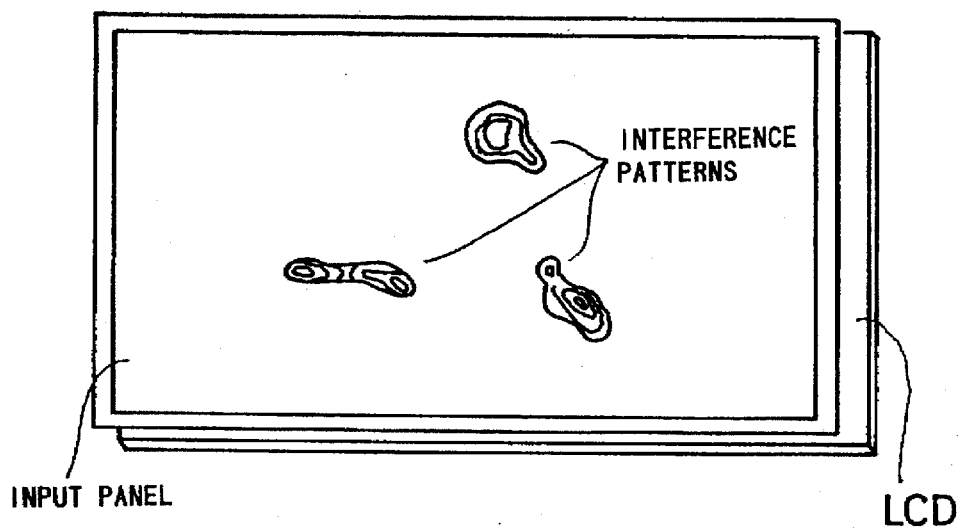
FIG. 3 is an illustrative drawing showing an example of interference patterns.
Figure 4:
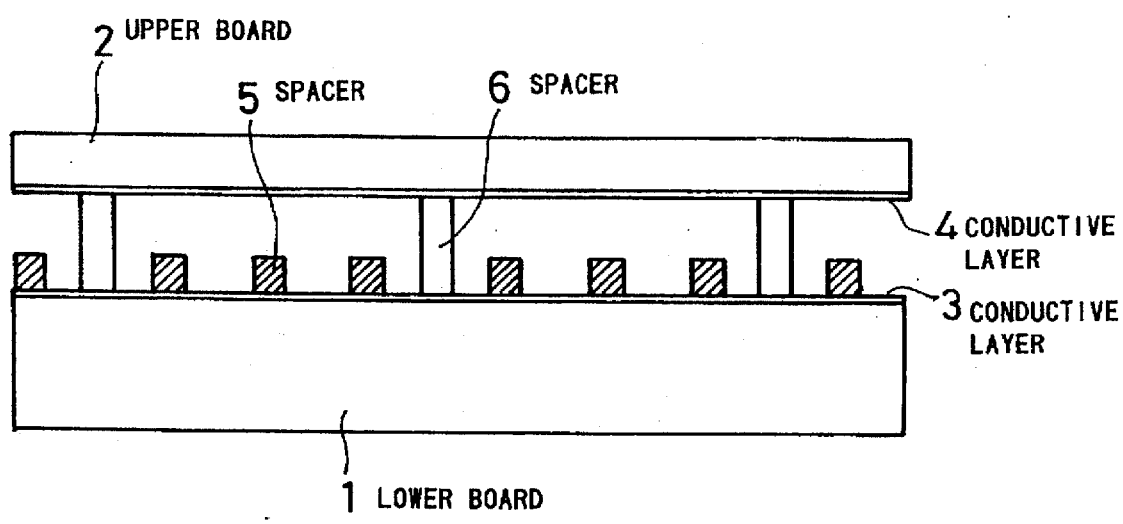
FIG. 4 is a cross-sectional view of an input panel according to the principle of the present invention.

FIG. 4 shows a principle of an input panel according to the present invention. In FIG. 4, the input panel includes a lower board 1, an upper board 2, transparent conductive layers 3 and 4, spacers 5, and other spacers 6.

The conductive layers 3 and 4 are provided on one surface of the lower board 1 and the upper board 2, respectively, so as to face each other. Between the lower board 1 and the upper board 2, the spacers 5 formed from an insulating material are distributed at constant intervals to hold a constant space between the two boards 1 and 2, and have the same height as those of the prior art, i.e., less than 14 μm.

Also, the spacers 6 are arranged between the upper board 2 and the lower board 1 in order to prevent a generation of optical interference. The spacers 6 have a greater height than do the spacers 5, which height is more than 15 μm. Also, the spacers 6 are arranged in a fewer number than that of the spacers 5 so as to be scattered among them.

Figure 5:
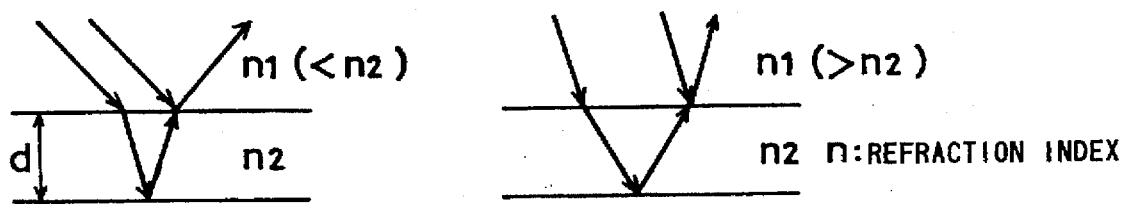
FIG. 5 is an illustrative drawing showing a mechanism of generating interference patterns.

FIG. 5 shows an illustrative drawing showing a mechanism of the generation of interference patterns.

Interference patterns are generated by optical interference between two light waves which are transmitted from the same optical source, separated into two different paths, and, then, combined together. FIG. 5 shows an interference occurring in a thin layer.

In FIG. 5, the interference occurs between light reflected on the upper surface and light reflected on the lower surface of the thin layer. Here, a wavelength of incident light is denoted by λ, and a difference in path lengths between light reflected on the upper surface and light reflected on the lower surface is denoted by D. Then, interference patterns appear as follows.

bright: if $D=2m\cdot\lambda/2$
dark: if $D=(2m+1)\cdot\lambda/2$

Here, m is an integer. Thus, bright portions of the interference pattern appear around points where the difference D in path lengths is equal to a multiple of the wavelength $\lambda$ of the light.

When the light incident to the thin layer is white light, a different color can be observed depending on a layer thickness d and an incident angle, since wavelengths of light strengthened by interference are different from wavelengths of light canceled by interference. However, when the layer thickness d becomes large, the wavelengths of the light strengthened by interference and the wavelengths of light canceled by interference come close to each other within a small range of wavelengths. Thus, when human vision cannot distinguish between different wavelengths within this small range, the wavelengths of light falling within the range are averaged over so that no color can be observed.

In the input panel of the prior art, in order to ensure a proper input sensitivity when using an input pen for entering an input and to prevent an erroneous input by a hand touching the input panel, the height of the spacer needs to be 2 to 14 μm. Unfortunately, a gap ranging from 2 to 14 μm is likely to cause the interference by light reflected by the two conductive layers. (For example, the gap ranging from 2 to 14 μm is four to thirty times the wavelength of 500 nm, which is about at the middle of a wavelength range of visible light.) In the present invention, various examinations about gaps have resulted in a finding that a gap larger than 15 μm is unlikely to generate interference patterns. The spacer configuration of the present invention is based on this finding.

According to the present invention, spacers arranged between the two conductive layers 3 and 4 include not only the spacers 5 of the prior art but also the spacers 6 having a height greater than 15 μm, which is greater than that of the prior art spacers 5. The spacers 6 are scattered among the spacers 5 such that the gap between the two conductive layers 3 and 4 is made larger to prevent the generation of interference patterns.

The spacer 6 for preventing the interference patterns is characterized by its height being greater than 15 μm, and, also, is characterized in that the spacers 6 are arranged in a smaller number than that of the spacers 5. Preferably, intervals between the spacers 6 range from 0.5 mm to 20 mm.

Figure 6:
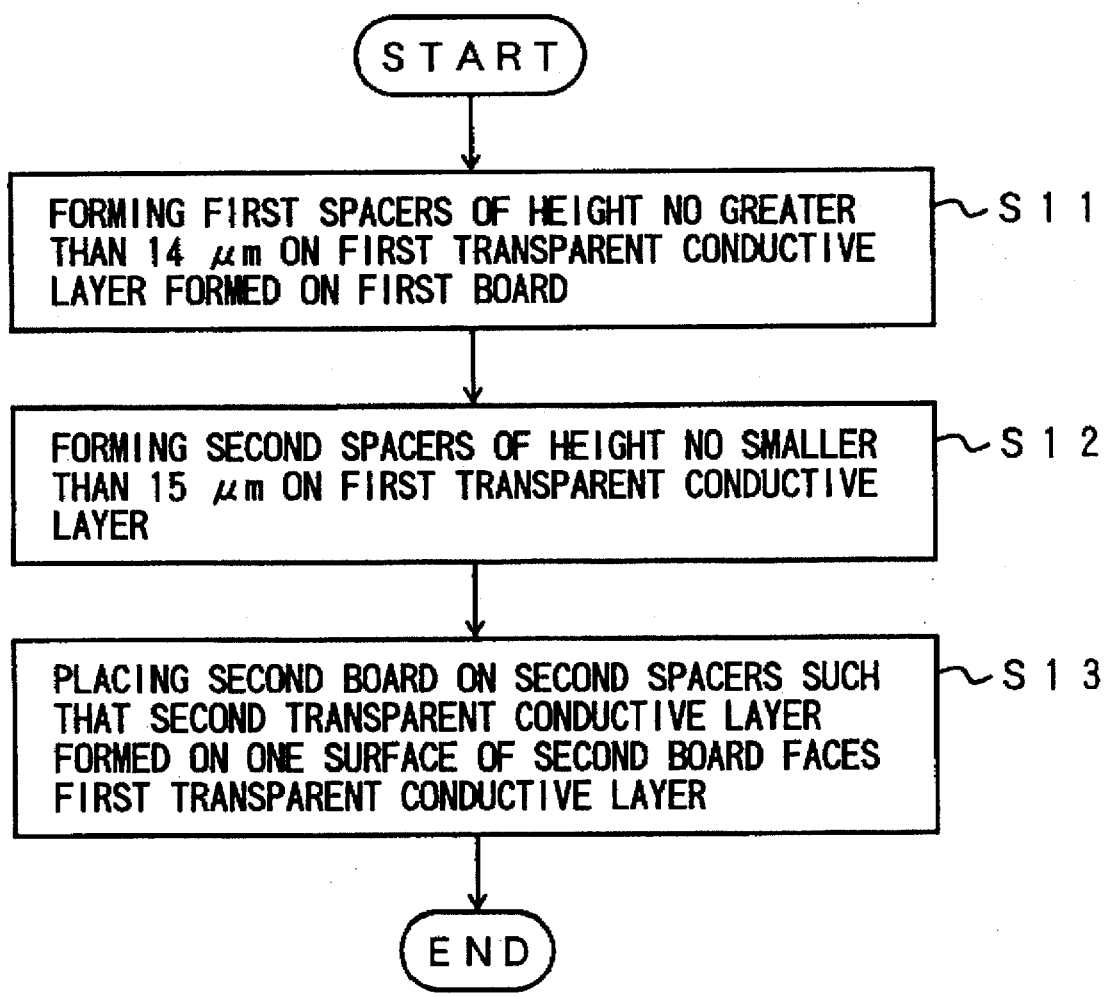
FIG. 6 is a flow chart of a process of forming the input panel of FIG. 4.
Figure 7A:
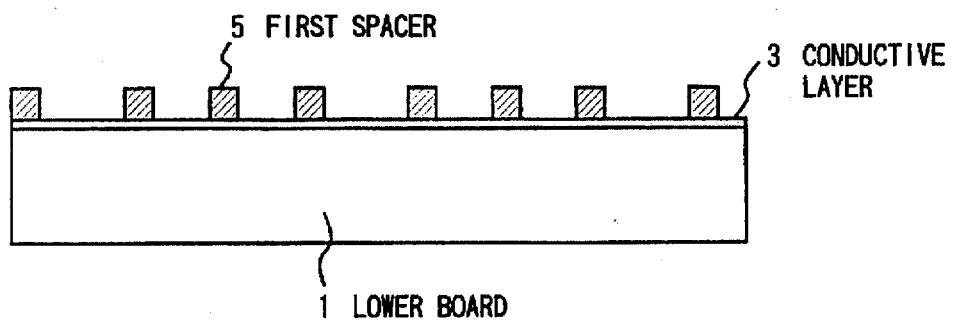
FIGS. 7A to 7C are process charts of the process of forming the input panel of FIG. 4.
Figure 7B:
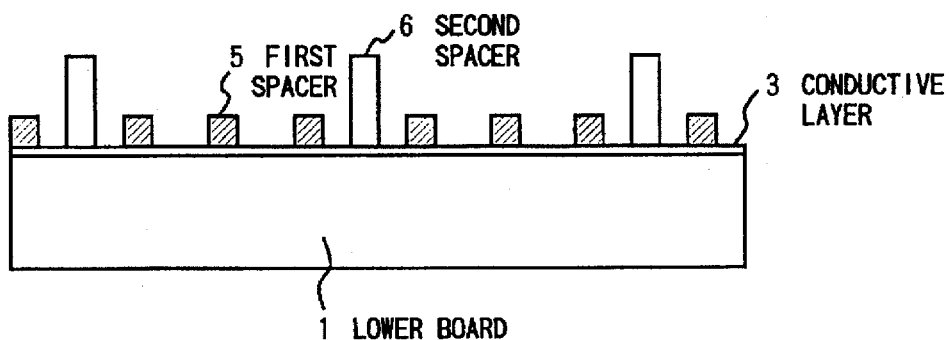
Figure 7C:
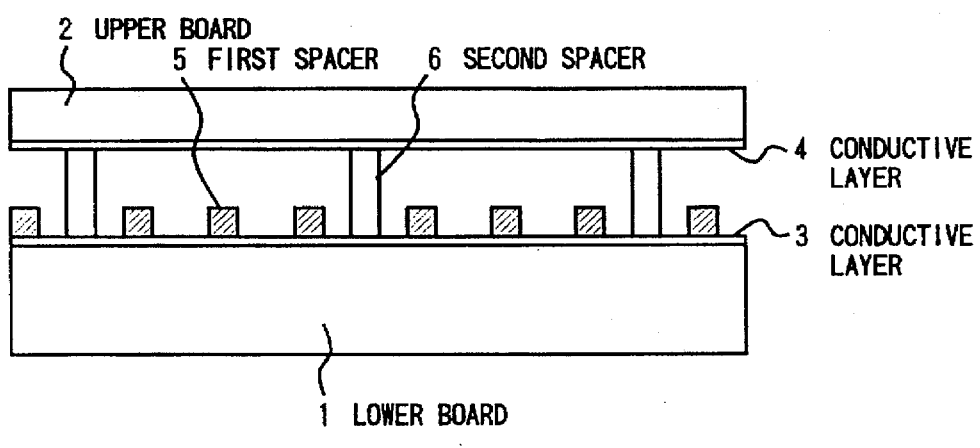

FIG. 6 shows a flow chart of a method of forming the input panel, and FIGS. 7A to 7C show process charts of the method. With reference to FIG. 6 and FIGS. 7A to 7C, the method of forming the input panel will be described.

At a step S11, the first spacers are formed on a first transparent conductive layer formed on a first board, as shown in FIG. 7A. Here, the first spacers are non-conductive, and have a height no greater than 14 μm.

At a step S12, the second spacers are formed on the first transparent conductive layer, as shown in FIG. 7B. The second spacers are non-conductive, and have a height no smaller than 15 μm.

At a step S13, a second board is placed on the second spacers such that a second transparent conductive layer formed on one surface of the second board faces the first transparent conductive layer, as shown in FIG. 7C.

A method of forming the spacers 6 and a material to be used will be described below.

A method of forming the spacers 6 may be a photolithography method which exposes a photoresist to patterning light and develops it to make a pattern. Or the spacers 6 may be formed by printing a thermoplastic resin, thermosetting resin, or an optical-setting resin in a printing process such as screen printing. Or the spacers 6 may be formed by scattering on the conductive layer small balls or particles made of a resin, an inorganic material, or a combination of inorganic material and organic material.

When these small balls or particles are scattered on the conductive layer, they may be coated beforehand by an adhesive resin for sticking them on the conductive layer. In order to position the small balls or particles, a metal mask having holes at predetermined positions may be used such that the small balls or particles are scattered on the metal mask placed on the conductive layer.

In contrast with the input panel of the prior art having the spacers 5 smaller than 14 μm between the conductive layers 3 and 4, the input panel of the present invention has the spacers 6 greater than 15 μm arranged among the spacers 5 of the prior art. Thus, the gap between the two conductive layers 3 and 4 becomes large so as to be able to prevent the generation of the interference patterns.

The spacers 6 are arranged at the intervals of 0.5 mm to 20 mm, which are wider intervals than those of the prior art spacers 5. Thus, the spacers 6 do not hinder the function of the input panel, and, at the same time, prevent the upper board 2 from bending downward to generate interference patterns.

The spacers 6 having the height greater than 15 μm can be formed by the photo process using the photoresist or the printing process using a resin such as the thermoplastic resin, the thermosetting resin, or the optical-setting resin. Or the spacers 6 can be the small balls or particles made of the resin material, the inorganic material, or the combination of organic material and inorganic material, which are coated with the adhesive resin and scattered on the conductive layer. In scattering the small balls or particles, the metal mask having holes at the predetermined locations can be used to arrange the spacers 6 at desired intervals.

Embodiments of the present invention will be described below.

[First Embodiment]

On an $SnO_2$ layer of a thickness of 1.1 mm provided on one surface of a glass plate, dots having a height of 10 μm and a size of 70 μm by 70 μm are formed at an intervals of 500 μm by a screen printing process. Then, on the same $SnO_2$ layer, dots having a height of 20 μm and the size of 70 μm by 70 μm are formed at intervals of 4.0 mm by a screen printing process. Both types of dots are arranged on nodes of a respective grid pattern. By using a screen printing method, Y-coordinate electrodes are formed on the $SnO_2$ layer.

X-coordinate electrodes are formed on an ITO (indium tin oxide) layer of a thickness of 175 μm which is provided on a film. Then an input panel is created by adhering the film to the glass plate such that both conductive layers face each other.

The input panel is connected to a control circuit, and operations of the panel are examined on an LCD.

No interference patterns are observed on the input panel. A hand pressure necessary to enter an input with an input pen is sufficiently light, and, at the same time, no erroneous input is made by, for example, fingers pushing the input panel. Thus, the input panel of the first embodiment provides a suitable input sensitivity.

[Second Embodiment]

On an $SnO_2$ layer of a thickness of 1.1 mm provided on one surface of a glass plate, dots having the height of 10 μm and the size of 70 μm by 70 μm are formed on nodes of a grid pattern at the intervals of 500 μm by a screen printing process. Then, divinyl benzene particles having a diameter of 50 μm, e.g., Micropearl (product name), are dispersed in a solution of an adhesive resin and alcohol, and are scattered on the SnO₂ layer of the glass panel.

In the same manner as in the first embodiment, Y-coordinate electrodes are formed on the SnO₂ layer, and an input panel is created by adhering the glass plate to a film having an ITO layer provided with X-coordinate electrodes.

Figure 8:
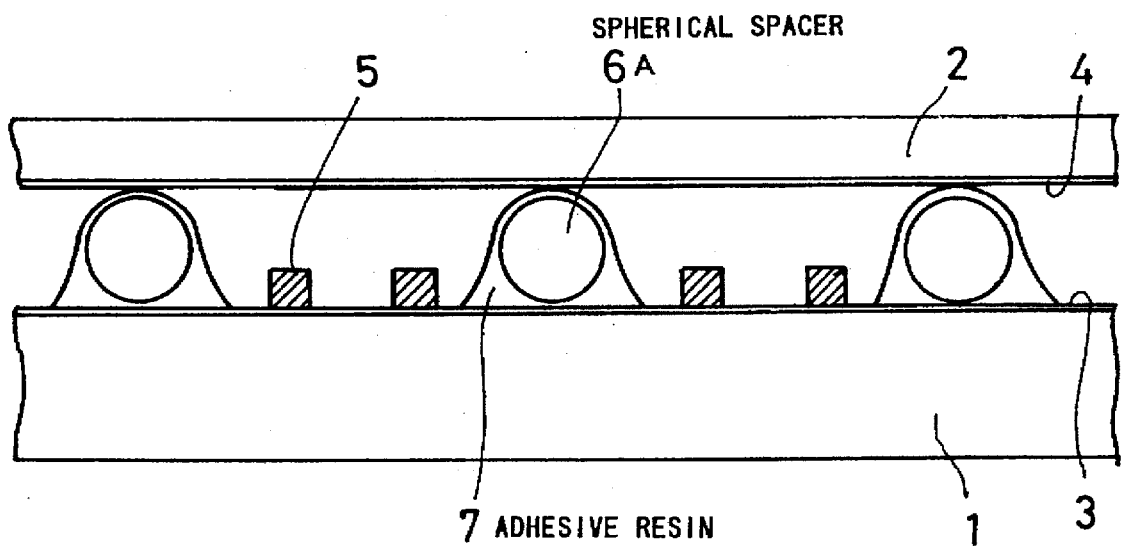
FIG. 8 is a cross-sectional view of an input panel according to a second embodiment of the present invention.

FIG. 8 shows the input panel of the second embodiment. In FIG. 8, the input panel includes the spacers 5 and spherical spacers 6A for preventing the generation of interference patterns. The spherical spacers 6A are stuck to the conductive layer 3 by adhesive resin 7.

No interference pattern is observed on the input panel placed on an LCD. Also, the input panel provides a suitable input sensitivity.

In the following, examples for a comparative purpose will be given.

[Comparative Example 1]

On an SnO₂ layer of a thickness of 1.1 mm provided on one surface of a glass plate, dots having the height of 10 μm and the size of 70 μm by 70 μm are formed on nodes of a grid pattern at the intervals of 500 μm by a screen printing process. Then, Y-coordinate electrodes are formed on the SnO₂ layer by using a screen printing method. Finally, an input panel is created by adhering the glass plate to a film having an ITO layer (175 μm of thickness) provided with X coordinate electrodes.

[Comparative Example 2]

An input panel of the comparative example 2 differs from that of the comparative example 1 only in the dot height and the intervals. In the comparative example 2, the dot height is 3 μm, and the intervals are 300 μm.

[Comparative Example 3]

In an input panel of the comparative example 3, the dot height is 14 μm, and the intervals are 700 μm. The rest is the same as that of the comparative example 1.

[Comparative Example 4]

The dot height is 17 μm, and the intervals are 1.0 mm. The rest is the same as that of the comparative example 1.

[Comparative Example 5]

The dot height is 17 μm, and the intervals are 1.5 mm. The rest is the same as that of the comparative example 1.

Examination of the input panels of the comparative examples are conducted on an LCD. TABLE 1 shows results of the examination.

By increasing the height of the spacers as in the comparative examples 4 and 5 in order to eliminate the interference patterns, a problem rises with regard to the input sensitivity. In the comparative example 4, the spacers of a 17-μm height and 1.0-mm intervals require a larger hand pressure for entering input compared to the comparative examples 1 to 3. This leads to a poor input sensitivity. A good input sensitivity is recovered by widening the spacer intervals to 1.5 mm in the comparative example 5. However, erroneous input by hand tends to be generated in the comparative example 5. As can be seen here, spacer intervals cannot be found which realize an input sensitivity satisfying both conditions of good pen input and no erroneous inputs.

As described above, the transparent input panel of the resistance layer type according the present invention has the upper and lower boards provided with the transparent conductive layers on the board surfaces facing each other, between which conductive layers the insulating spacers are arranged in the dot form or the mesh form. The input panel of the present invention is characterized in that the spacers having a height greater than 15 μm and the spacers having a height smaller than 14 μm are arranged in a mixed manner. With this configuration, interference patterns which are generated in a uniform arrangement of the spacers smaller than 14 μm can be eliminated. Thus, this input panel, when installed on a display, can provide an input capacity as sensitive as that of the prior art, yet eliminate interference patterns which would hinder the clarity of the display.

In particular, the spacers of the height greater than 15 μm are arranged at the intervals from 0.5 mm to 20 mm, which are wider than the intervals of the spacers of the height smaller than 14 μm. This arrangement can realize desirable input characteristics in terms of the input sensitivity.

In creating the spacers of the height greater than 15 μm on the conductive layer in order to prevent interference patterns, the photo process using a photoresist or the printing process using the thermoplastic resin, the thermosetting resin, or the optical-setting resin can be employed without a need for a complex process.

Also, the small balls or particles made of the resin material, the inorganic material, or the combination of the organic material and the inorganic material can be coated with the adhesive resin or the adhesive glass so as to be scattered on the conductive layer in order to form the spacers. Thus, the spacers can be manufactured in a large number by using simple devices.

Furthermore, in scattering the small balls or particles, the metal mask having the holes at the predetermined locations can be used to arrange the spacers at the desired intervals.

TABLE 1

| COMPARATIVE EXAMPLE | CONFIGURATION OF SPACERS | | INTERFERENCE PATTERN | INPUT SENSITIVITY | |
|---|---|---|---|---|---|
| | HEIGHT | INTERVAL | | PEN INPUT | ERROR INPUT |
| EXAMPLE 1 | 10 μm | 500 μm | extensive | good | none |
| EXAMPLE 2 | 3 μm | 300 μm | extensive | good | none |
| EXAMPLE 3 | 14 μm | 700 μm | observed | good | none |
| EXAMPLE 4 | 17 μm | 1.0 mm | none | poor | none |
| EXAMPLE 5 | 17 μm | 1.5 mm | none | good | occurred |

As shown in the comparative examples 1 to 3 of TABLE 1, the spacers with a height no greater than 14 μm end up generating undesirable interference patterns.

Further, the present invention is not limited to these embodiments, but various variations and modifications may be made without departing from the scope of the present invention.

What is claimed is:

1. An input panel of a resistance layer type comprising:

a first board having a first transparent conductive layer on one surface;

a second board having a second transparent conductive layer on one surface, said first board and said second board being arranged such that said first transparent conductive layer faces said second transparent conductive layer;

first spacers arranged between said first board and said second board, said first spacers being non-conductive and having a height no greater than 14 µm; and second spacers arranged between said first board and said second board among said first spacers, said second spacers being non-conductive and having a height no smaller than 15 µm.

2. The input panel as claimed in claim 1, wherein said first spacers and said second spacers are formed in a dot shape or a mesh shape.

3. The input panel as claimed in claim 1, wherein said second spacers are arranged at intervals from 0.5 mm to 20 mm, and said first spacers are arranged at smaller intervals.

4. An input panel of a resistance layer type comprising:

a first board having a first transparent conductive layer on one surface;

a second board having a second transparent conductive layer on one surface, said first board and said second board being arranged such that said first transparent conductive layer faces said second transparent conductive layer;

first spacers arranged between said first board and said second board, said first spacers being non-conductive; and second spacers arranged between said first board and said second board among said first spacers, said second spacers being non-conductive and having such a height that no interference pattern is generated, wherein said first spacers have such a height smaller than that of said second spacers that an appropriate input sensitivity of said input panel can be achieved.

5. A method of forming an input panel of a resistance layer type, said method comprising the steps of:

a) forming first spacers on a first transparent conductive layer formed on a first board, said first spacers being non-conductive and having a height no greater than 14 µm;

b) forming second spacers on said first transparent conductive layer, said second spacers being non-conductive and having a height no smaller than 15 µm; and c) placing a second board on said second spacers such that a second transparent conductive layer formed on one surface of said second board faces said first transparent conductive layer.

6. The method as claimed in claim 5, wherein said step b) comprises a step of forming second spacers by using a photoresist in a photo process.

7. The method as claimed in claim 5, wherein said step b) comprises a step of forming second spacers by using a thermoplastic resin, a thermosetting resin, or an optical-setting resin in a printing process.

8. The method as claimed in claim 5, wherein said step b) comprises the steps of:

forming second spacers as small balls or particles made of a resin material, an inorganic material, or a combination of an organic material and an inorganic material; and scattering said second spacers on said first transparent conductive layer.

9. The method as claimed in claim 8, wherein said step b) further comprises a step of adhering said second spacers to said first transparent conductive layer by using an adhesive.

10. The method as claimed in claim 8, wherein said step of scattering said second spacers comprises a step of scattering said second spacers by using a mask which has holes at predetermined locations and is placed on said first transparent conductive layer, so that said second spacers can be positioned at said predetermined locations.

* * * * *